UNITED STATES PATENT OFFICE.

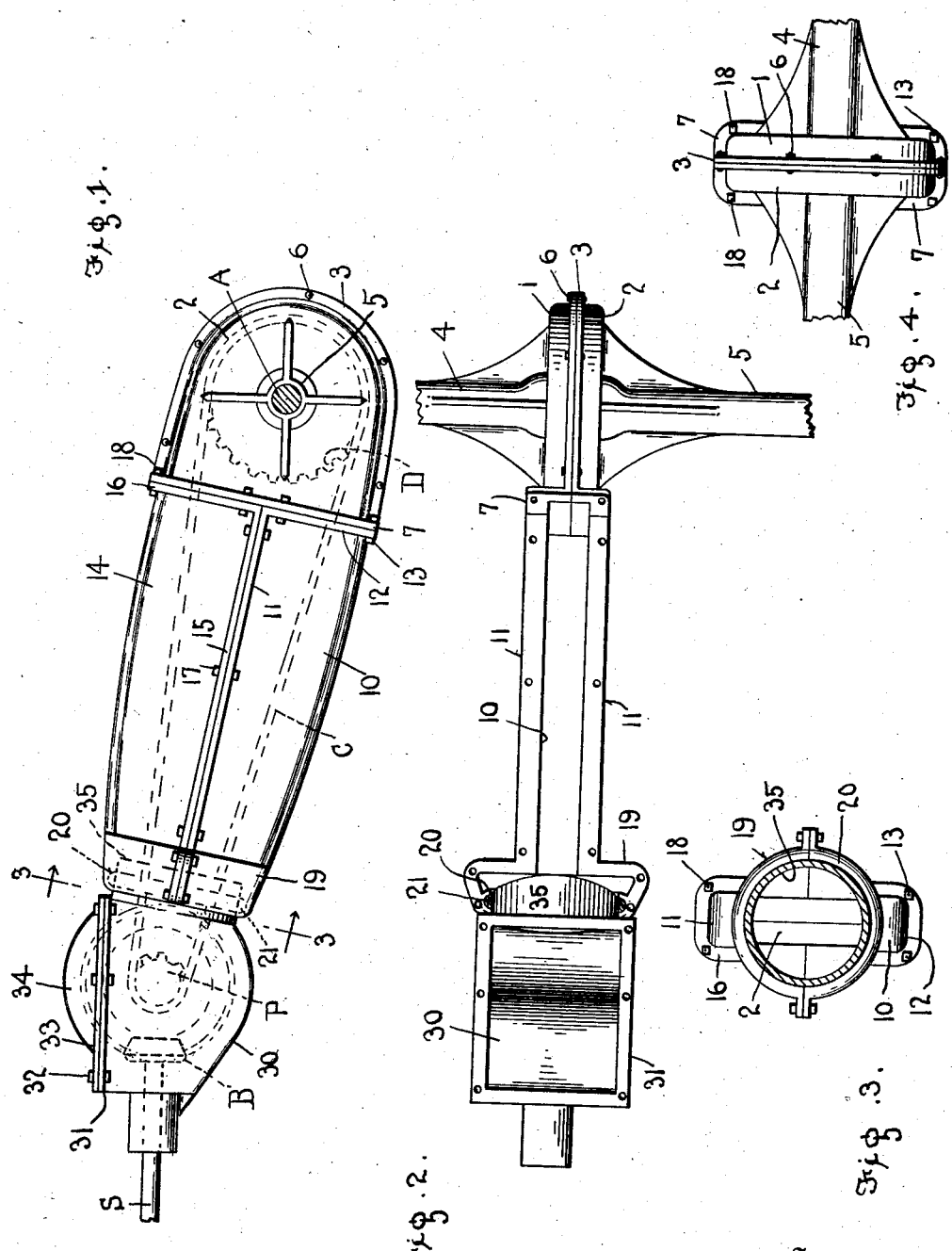

ARNOLD P. HOFFMAN, WILLIAM E. HOFFMAN, AND ELMER F. ALTMAN, OF MINNEAPOLIS, MINNESOTA.

SPROCKET-CHAIN HOUSING.

1,027,605.

Specification of Letters Patent. Patented May 28, 1912.

Application filed July 24, 1911. Serial No. 640,049.

*To all whom it may concern:*

Be it known that we, ARNOLD P. HOFFMAN, WILLIAM E. HOFFMAN, and ELMER F. ALTMAN, citizens of the United States, residing at Minneapolis, in the county of Hennepin and State of Minnesota, have invented certain new and useful Improvements in Sprocket-Chain Housings; and we do declare the following to be a full, clear, and exact description of the invention, such as will enable others skilled in the art to which it appertains to make and use the same.

This invention relates to machine elements and more especially to sprockets and sprocket chains; and the object of the same is to produce an improved case which will cover both sprocket wheels and the chain that connects them and will inclose all parts in an oil-tight manner while yet permitting adjustment and having a certain degree of flexibility. This object is accomplished by the construction hereinafter more fully described and claimed and shown in the drawings wherein—

Figure 1 is a side elevation of this invention complete, with the sprocket wheels and chain in dotted lines; Fig. 2 is a plan view of the casing with certain of the upper parts removed; Fig. 3 is a section on the line 3—3 of Fig. 1; Fig. 4 is a rear elevation, showing that portion of our device which surrounds the driven sprocket and parts of the housing for the two ends of the axle.

In the drawings we have shown this housing as connected around the driving mechanism of a chain-driven automobile, and the letter S designates the shaft thereof connected by bevel gears B with the power sprocket P, which in turn is connected by a chain C with the driven sprocket D mounted on the rear axle A of the automobile in a manner well understood in the art. We do not wish to be confined to this application of our invention, but have illustrated it because perhaps the greatest need for a gear and chain housing is beneath an automobile where dust and dirt must be excluded and oil retained in order that the parts may run free and easy. This fact is so well recognized that hitherto many efforts have been made to produce a strictly oil-proof housing of this character, because if it be made so tight that oil may not escape from the interior it must necessarily be so tight that dust will not be admitted from the exterior.

Coming now more particularly to our present invention, the housing as a whole is made in members whereof one surrounds the driven sprocket D, another the chain C and another the power sprocket P, and each member is made in parts so that they may be separated in order to gain access to the interior for purposes of inspection and repair. By our invention the chain member and power member are telescopically adjustable upon each other so that, when it becomes necessary to lengthen the distance between the power sprocket and the rear axle as by adjusting the latter slightly, said members of the casing will slide upon each other while still retaining the oil and excluding the dirt. The driven sprocket member is made in two parts 1, 2, having flanges 3 where they meet; and these parts preferably carry rear axle casings 4 and 5 respectively, although such features form no part of our present invention. The flanges 3 are connected by bolts 6 so that this member forms a complete casing or housing for the driven sprocket D. The two parts 1 and 2 are substantially semi-circular in side elevation as shown in Fig. 1 so as to surround this sprocket and the straight portions of the chain C, and across their front ends they have lateral flanges 7 as shown.

The chain-inclosing member of the housing is also by preference made in two parts, whereof the lowermost numbered 10 has side flanges 11 along its upper edge and lateral flanges 12 along its rear end adapted to be bolted as at 13 to the lateral flanges 7 of the member above described; and this lower part of the intermediate or chain member will probably remain in place. The upper part 14 has similar side flanges 15 and lateral flanges 16, the former connected by bolts 17 with the side flanges 11 of the lower part 10, and the lateral flanges 16 connected by bolts 18 with the lateral flanges 7 of the rear member of the casing. Thus it will be seen that by removing the bolts 17 and 18 the upper part 14 of the intermediate member can be lifted off of the lower part 10 thereof to gain access to the interior as when the chain must be repaired. One of the important features of our invention lies in the fact that the front ends of these parts 10 and 14 have lateral enlargements 19 as best seen in Fig. 2, producing what might be called a "bell" at the front end of this member, and the mouth of this bell is surrounded by an internal groove 20 containing packing 21 of any suitable material. It is to be understood of course that the bell end of this member is in two parts, each of which is itself the front portion of one of the parts 10 or 14, and the channel which forms the groove 20 must therefore be in two parts that meet end to end when the two parts of this entire member are put together and connected by the bolts 17.

The power-sprocket member of this improved housing is made of a lower part 30 which may be in one piece or in two as preferred but which must be of a proper shape to rather closely surround the power sprocket P and the bevel gears B and inclose the rear end of the driving shaft S and the bearing therefor. The lower part has side flanges 31 along its upper edge, through which pass bolts 32 engaging side flanges 33 along the side edges of the top part 34 of this member whereby this part is rendered removable as when it becomes necessary to gain access to the power sprocket P or the bevel gears B. An essential feature of our invention, however, lies in the fact that the rear end of the lower part 30 (whether the latter be in one piece or two) is formed with a tubular neck 35 projecting rearward and downward slightly and of a size to pass into the mouth of the bell-end 19 of the intermediate member of our improved housing, and fit closely within the packing 21 in its groove 20 as best seen in Fig. 2.

Thus is built up a combined sprocket and chain housing whereof each member is made in two parts and the upper part is removable whenever desired so that access to the interior may readily be gained, and wherein there is a certain amount of relative movement between the member which surrounds the power sprocket P and the driving mechanism, and the other members which surround the driven sprocket D and the chain C respectively.

It is well known that in chain-driven automobiles where the driving mechanism is sustained in bearings depending from the chassis or frame and the driven mechanism is mounted on the rear axle beneath the springs, inequalities in the roadway and the compression and expansion of the springs cause a constant vertical movement of the axle relative to the chassis which is permitted by the chain connection between the driving and driven sprockets. In this movement the rear portions of our improved housing rise and fall slightly whereas the front member does not, and hence our provision of the bell-mouth or enlargement 19 at the forward end of the intermediate member and the neck 35 at the rearward end of the forward member, with the packing 21 interposed between them. This construction permits a certain flexibility of the members with relation to each other to accommodate the rise and fall of the rear axle A. Furthermore it is well known that when the chain becomes loose the rear axle can be adjusted slightly to the rear (by means not shown herein) to take up such looseness, and this also is permitted by the telescopic connection between such bell-mouth and neck. Finally, when a chain link breaks and the upper part 14 of the intermediate member of our housing is removed to insert a new link, the withdrawal of the bolts 17 and 18 will permit and the upper half of the bell mouth 19 will come off with the upper part 14 of this member. Having repaired the chain, whatever adjustment in the rear axle is required to give the chain the proper tension is then permitted by the telescopic connection between the two members of our housing as above set forth. We do not confine ourselves to the exact sizes, shapes proportions or materials of parts, nor to precise details further than as set forth below. Emphasis is laid on the fact that the packing employed should be oil-proof, because when oil or grease is used on the sprocket or chain it cannot then escape, and if the members of this housing are packed with oil or grease the sprockets and chains will run in a continuous bath. Moreover, if the packing is oil-proof it will be so tight that sand and other extraneous matter cannot be admitted to the casing at any point, for of course it is to be understood that where the flanges meet and are bolted together the parts of the various members are connected almost air-tight.

What is claimed as new is:

1. The herein described sprocket housing comprising two members, one having a tubular neck directed toward the other, and the latter having an enlarged end with a bell mouth loosely surrounding said neck and containing an internal groove, and packing in said groove around said neck to permit telescopic and flexible movements between the said members.

2. The herein described sprocket housing comprising an outer member having an open inner end with lateral flanges, an intermediate member made in two parts having lateral flanges at their outer ends adapted to contact with those mentioned and having side flanges along their meeting lines adapted to contact with each other, the inner ends of both parts having enlargements complementing each other and provided with internal grooves meeting end to end so as to produce a bell mouth on this member, means for detachably connecting all said flanges where they meet, an inner member having a tubular neck projecting into said bell mouth, and packing within the groove around such neck.

3. The herein described sprocket housing comprising an outer member having an open front end with lateral flanges, an intermediate member made in two parts having lateral flanges at their rear ends adapted to contact with those mentioned and having side flanges along their meeting lines adapted to contact with each other, an inner member made in two parts having side flanges along their meeting lines adapted to contact with each other, means for detachably connecting all said flanges where they meet, and a telescopic connection between the two members last named.

In testimony whereof we have hereunto set our hands in presence of two subscribing witnesses.

ARNOLD P. HOFFMAN.
WILLIAM E. HOFFMAN.
ELMER F. ALTMAN.

Witnesses:
F. H. AYERS,
A. E. PUFFER.

Copies of this patent may be obtained for five cents each, by addressing the "Commissioner of Patents, Washington, D. C."